United States Patent [19]
Rilling

[11] Patent Number: 6,112,590
[45] Date of Patent: *Sep. 5, 2000

[54] DEVICE FOR MEASURING THE MASS OF A FLUID ELEMENT

[75] Inventor: Heinz Rilling, Eberdingen, Germany

[73] Assignee: Robert Bosch GmbH, Stuttgart, Germany

[ * ] Notice: This patent is subject to a terminal disclaimer.

[21] Appl. No.: 09/125,433

[22] PCT Filed: Oct. 15, 1997

[86] PCT No.: PCT/DE97/02358

§ 371 Date: Aug. 18, 1998

§ 102(e) Date: Aug. 18, 1998

[87] PCT Pub. No.: WO98/27408

PCT Pub. Date: Jun. 25, 1998

[30] Foreign Application Priority Data

Dec. 18, 1996 [DE] Germany .................... 196 52 753

[51] Int. Cl.[7] ........................................ G01F 1/68
[52] U.S. Cl. .......................... 73/204.21; 73/118.2
[58] Field of Search ................. 73/204.18, 204.21, 73/204.11, 202.5, 118.2

[56] References Cited

U.S. PATENT DOCUMENTS

| | | | |
|---|---|---|---|
| 2,255,771 | 9/1941 | Golay | 73/204.21 |
| 3,683,692 | 8/1972 | Lafitte | 73/202.5 |
| 4,412,449 | 11/1983 | Eiermann et al. | 73/204.21 |
| 5,081,866 | 1/1992 | Ochiai et al. | 73/204.21 |
| 5,167,147 | 12/1992 | Peters et al. | 73/118.2 |
| 5,253,517 | 10/1993 | Molin et al. | 73/118.2 |
| 5,596,969 | 1/1997 | Lipinski | 73/204.21 |
| 5,918,279 | 6/1999 | Hetch et al. | 73/204.21 |

*Primary Examiner*—Harshad Patel
*Attorney, Agent, or Firm*—Ronald E. Greigg; Edwin E. Greigg

[57] ABSTRACT

Device for measuring the mass of a flowing medium has a measuring element accommodated in a measurement fitting, wherein a flow rectifier with a grating is provided upstream of the measuring element. For simple manufacturing, assembly, and precise alignment of a grating in relation to a flow rectifier, the flow rectifier has detent elements that can elastically deform during installation of the grating in order to secure the grating to the flow rectifier in a detachable fashion. The device provided for measuring the mass of a flowing medium, in particular for measuring the flow of an intake air mass for internal combustion engines.

8 Claims, 3 Drawing Sheets

DEVICE FOR MEASURING THE MASS OF A FLUID ELEMENT

PRIOR ART

The invention is based on a device for measuring the mass of a flowing medium. A device has already been disclosed (EP-PS 0 458 998), which has a measuring element accommodated in a measurement fitting, wherein a flow rectifier and a grating are accommodated upstream of the measuring element. The flow rectifier is provided to generate as uniform a flow as possible over the entire inner cross section. The grating permanently fastened to the flow rectifier is intended to produce extremely fine eddies in the flow in order to produce flow conditions that are as constant as possible downstream of the grating so that a stabilization of the measurement signal is produced at the measuring element. In order to prevent a dispersion of the characteristic curve of the measurement signal emitted by the measuring element, it is particularly important that the grating be disposed in a precise alignment to the flow rectifier. This is carried out in the known device by embedding the grating in a heated state into a ring of the flow rectifier. The grating is a wire grating that has individual wires that are woven with one another into a grating structure. In the course of this, the wires retain a certain ability to shift in relation to one another. Embedding the wire grating in the plastic results in the disadvantage that with a change in temperature and with the aging of the plastic of the flow rectifier due to creeping processes, a buckling of the wire grating can occur. The buckling of the wire grating, though, leads to a disadvantageous change in the characteristic curve of the measuring element. The permanent fastening of the grating to the flow rectifier results in the further disadvantage that only relatively costly flow rectifiers with gratings of different mesh widths can be combined with one another. Furthermore, the provided embedding of the grating into the plastic of the flow rectifier is relatively costly for technical manufacturing reasons. Moreover, there is the danger that in the embedding of the grating in the heated state into the ring of the flow rectifier, expelled plastic remains in the flow rectifier so that hindrances in the flow arise that could lead to a signal scattering, particularly in a mass production.

ADVANTAGES OF THE INVENTION

The device according to the invention for measuring the mass of a flowing medium, has the advantage over the prior art that it produces a simple manufacturing method and installation of the device. It is advantageous that the flow rectifier can be produced in a particularly simple manner as a compact standard component with a grating with a varying mesh width or a varying opening cross section, wherein a precise alignment of the through flow openings of the flow rectifier to the through flow openings of the grating is produced. It is also advantageous that a buckling of the grating can be prevented, by means of which the measurement precision and in particular, the measurement stability increase during continuous operation of the device. Furthermore, for a scheduled disassembly of the device, it turns out that the flow rectifier and the grating exist individually and can be separated without destroying them, by means of which it is possible to simply reuse these parts.

Advantageous improvements and updates of the device are possible by means of the measures taken herein.

The provided manufacturing method of the grating, in which it is stamped out of a thin metal strip, is also advantageous and permits the through flow cross sections of the grating to be produced with a very high precision without increasing the manufacturing costs of the grating in so doing. It is advantageous that gratings with various mesh widths or with various through flow cross sections can be produced in a particularly simple manner.

BRIEF DESCRIPTION OF THE DRAWINGS

An exemplary embodiment of the invention is shown in a simplified manner in the drawings and will be explained in more detail in the description that follows.

DESCRIPTION OF THE EXEMPLARY EMBODIMENT

Figure 1:
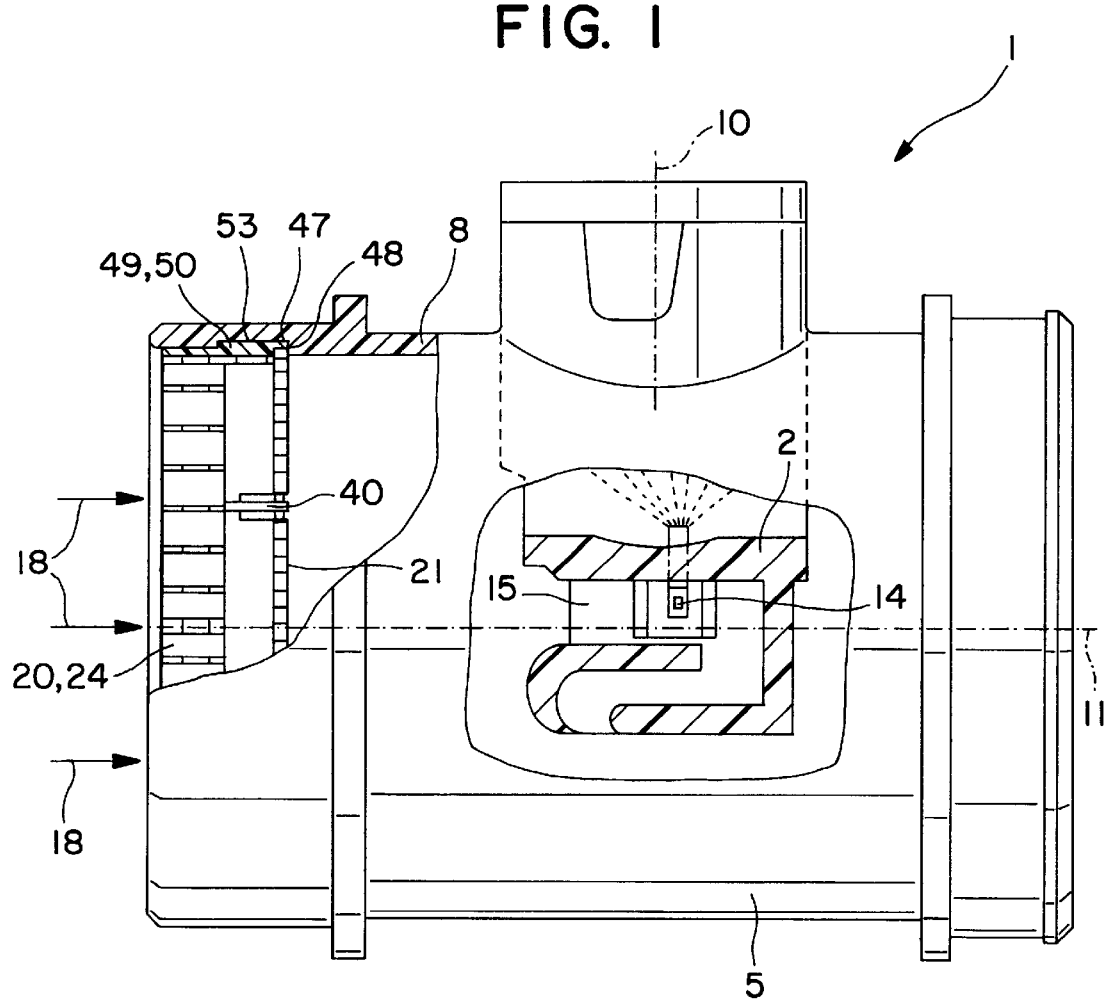
FIG. 1 shows a device according to the invention in a partially sectional representation.

FIG. 1 shows a device 1 for measuring the mass of a flowing medium, in particular the intake air mass of internal combustion engines, in a partially sectional representation. The internal combustion engine can be a mixture compressing engine with externally supplied ignition, or can also be an air compressing, self-igniting engine. The device 1 has a measuring part 2, which is inserted, for example in plug-in fashion, into a measurement fitting 5 of the device 1. The measuring part 2 has a for example slender, rod-like, block-shaped form that extends elongated in the direction of a plug axis 10, and is inserted, for example in plug-in fashion, into an opening let into a wall 8 of the measurement fitting 5. The wall 8 defines a flow cross section that has a for example circular cross section in the center of which a central axis 11 extends in the direction 18 of the flowing medium, parallel to the wall 8 and is oriented perpendicular to the plug axis 10. The direction of the flowing medium is indicated in FIG. 1 by corresponding arrows 18 and runs from left to right there.

A measuring element 14 is inserted together with the measuring part 2 into the flowing medium. A measuring conduit 15 is embodied in the measuring part 2 of the device 1, and the measuring element 14 for measuring the medium flowing in the measurement fitting 5 is accommodated in this conduit. The design of this type of measuring part 2 with measuring element 14 is sufficiently known to one skilled in the art, for example from DE-OS 44 07 209, whose disclosure is intended to be a component of the current patent application.

Figure 2:
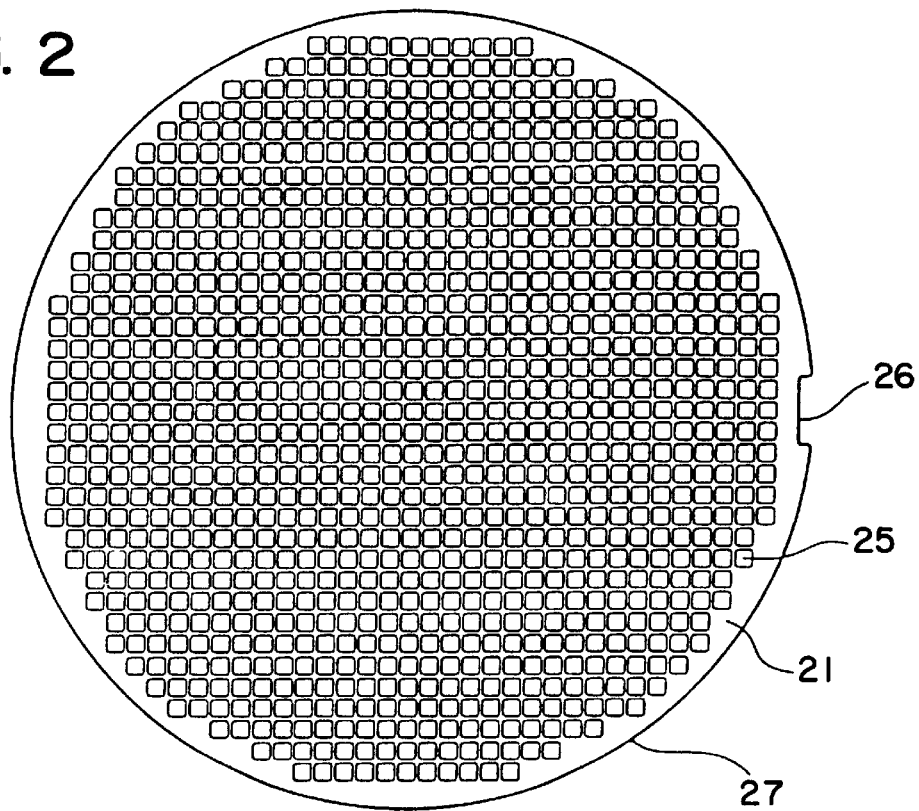
FIG. 2 is a top view of a grating of the device.
Figure 3:
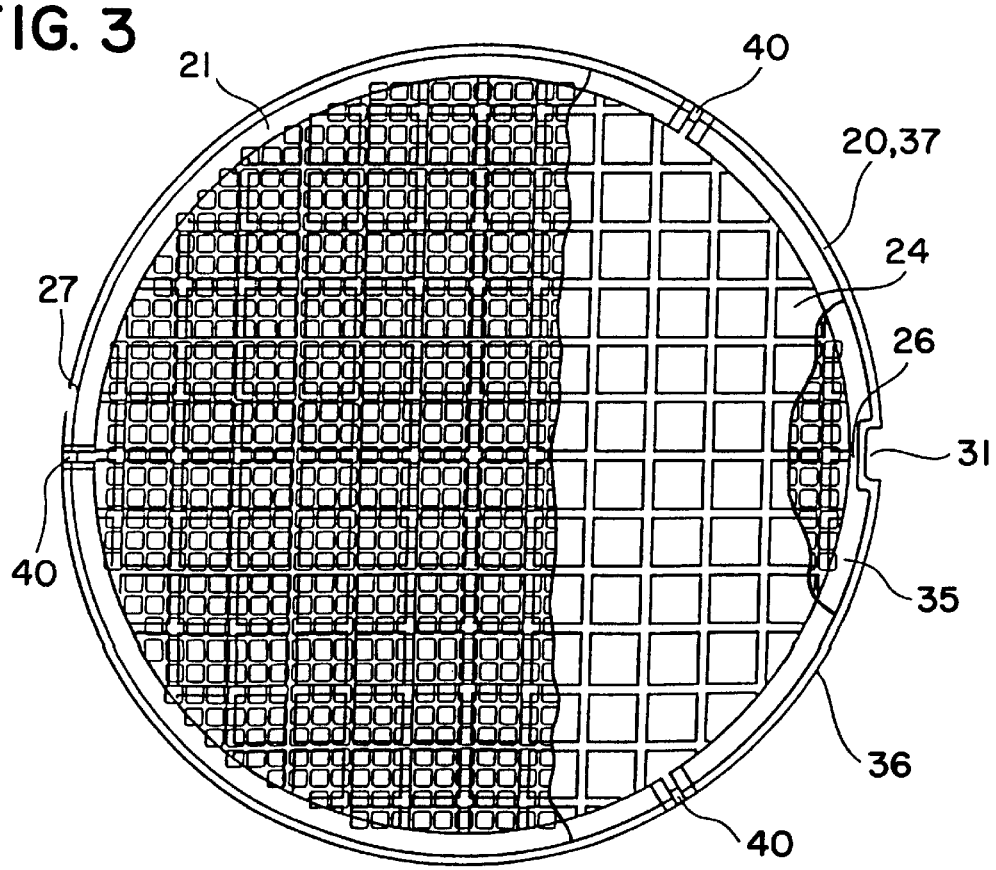
FIG. 3 is a top view of a flow rectifier with the grating according to FIG. 2.

A sleeve-shaped flow rectifier 20 and a grating 21 are provided upstream of the measuring element 14. The flow rectifier 20 is comprised of plastic and is manufactured, for example, by means of injection molding, and has a large number of openings 24 that extend in the flow direction and are, for example, rectangular. As shown in FIG. 2, a top view of the grating 21, the grating 21 has openings 25 in the flow direction that are, for example likewise embodied as rectangular. The grating 21 is preferably comprised of an inert material, such as stainless steel, and is manufactured by being stamped out of a thin metal strip. Furthermore, the grating 21 has at least one notch 26, which extends radially inward from an edge 27 of the grating 21 and has, for example, a rectangular shape, in order to enclose a correspondingly embodied projection 31 of an inner surface 35 of the flow rectifier 20 extending radially inward from the inner surface 35, as shown in FIG. 3, a top view of the flow rectifier 20 with the grating 21. The position of the at least one notch 26 is definitely fixed in relation to the flow openings 25 of the grating 21 and can be produced like the flow openings 25 by being stamped out of a thin metal strip. Particularly in mass production, the projection 31 of the flow rectifier 20 and the associated notch 26 on the grating 21 permit a very exact alignment and association of the flow openings 25 of the grating 21 with the openings 24 of the flow rectifier 20 in a simple manner.

Figure 4:
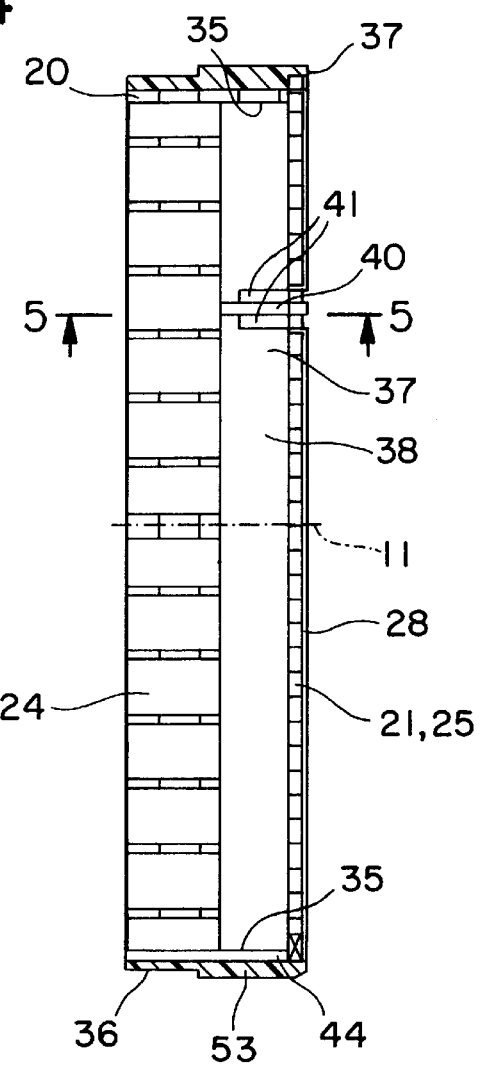
FIG. 4 is a side view of the flow rectifier with grating according to FIG. 3.
Figure 5:
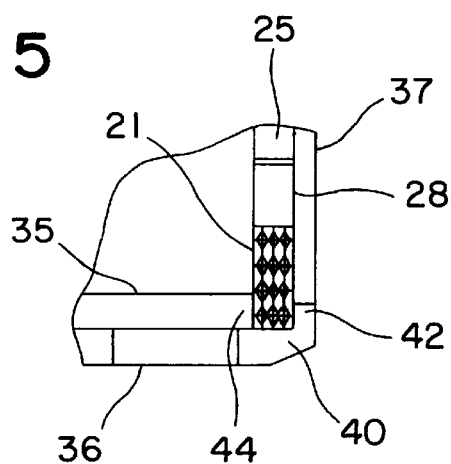
FIG. 5 shows a cross sectional view of the flow rectifier with grating along the line 5—5 of FIG. 4.

The securing of the grating 21 to the flow rectifier 20 is carried out in a detachable fashion by means of detent elements, embodied for example in the form of detent hooks 40, provided on the flow rectifier 20. For example, three detent hooks 40 can be provided, which on the circumference of the flow rectifier 20 have an angular spacing of approximately 120 degrees. As shown in more detail in FIG. 4, a sectional representation of the flow rectifier 20 with grating 21, the detent hooks 40 are embodied between two cutouts 41, which are provided in an annular wall 37 between the inner surface 35 and an outer surface 36 of the flow rectifier 20 and extend, for example, parallel to the central axis 11. The detent hooks 40 are spring-elastic and, as shown in more detail in FIG. 5, a detail from FIG. 4, have a detent head 42 that extends radially inward. When the grating 21 is already installed, the detent heads 42 encompass the edge 27 of the grating 21 like teeth and rest against a surface 28 of the grating 21 oriented toward the measuring part 2 in order to thus hold the grating 21, pressed by the detent heads 42, against a circumferential stop 44 of the flow rectifier 20 constituted by the inner surface 35. The removal of the grating 21 can be carried out by means of a corresponding bending of the detent hooks 40. The detent connection of the grating 21 constituted by the detent hooks 40 produces an assembly unit constituted by the grating 21 and the flow rectifier 20, which permits a simplified installation of the device 1.

For the final installation of the device 1, the assembly unit constituted by the flow rectifier 20 and the grating 21 is inserted into a circular opening 47 provided on the upstream end of the measurement fitting 5 until the flow rectifier 20 rests with its annular wall 37 against a stop 48 of the measurement fitting 5, the stop decreases the cross section of the opening 47. To permanently fasten the flow rectifier 20 in the opening 47, the rectifier has, for example, barb-shaped hook elements 53 extending outward in an approximately radial direction from its outer surface 36, which can correspondingly engage in detent fashion in a groove 50 provided on the inner wall 49 of the opening 47 of the measurement fitting 5. It is, however, also possible to fasten the flow rectifier 20 in the opening 47 of the measurement fitting 5 in another manner, for example by means of ultrasound welding or gluing.

The foregoing relates to a preferred exemplary embodiment of the invention, it being understood that other variants and embodiments thereof are possible within the spirit and scope of the invention, the latter being defined by the appended claims.

What is claimed is:

1. A device for measuring the mass of a flowing medium, comprising a measuring fitting (5), a measuring part (2) in said measuring fitting, a measuring conduit (15) in said measuring part (2), a measuring element (14) accommodated in said measuring part (2), said measuring element is embodied for measuring the mass of the flowing medium, a flow rectifier (20) and a grating (21) in one end of said measuring fitting provided upstream of the measuring element, in which the flow rectifier (20) has spring-elastic detent hooks (40) for fastening the grating (21) to the flow rectifier (20).

2. The device according to claim 1, in which the detent hooks (40) are formed by cutouts (41) through an annular wall between an inner surface (35) and an outer surface (36) of the annular wall (37) of the flow rectifier (20).

3. The device according to claim 1, in which the detent hooks (40) have detent heads (42) that extend radially inward and rest against a surface (28) of the grating (21) oriented toward the measuring element (14) in order to fasten the grating (21).

4. The device according to claim 1, in which the detent elements (40) are provided on the circumference of the flow rectifier (20).

5. The device according to claim 1 in which the grating (21) has at least one notch (26) on an edge (27), in which a projection (31) of the flow rectifier (20) engages in order to positionally fix the grating (21).

6. The device according to claim 1 in which the flow rectifier (20) has a circumferential stop (44) constituted by an inner surface (35), against which the grating (21) rests.

7. The device according to claim 1, in which the grating (21) is is stamped from a thin metal strip.

8. The device according to claim 1, in which the flow rectifier (20) is comprised of plastic.

* * * * *